Feb. 15, 1944. J. SCHEPPS 2,341,950
DISPENSING DEVICE
Filed Feb. 4, 1942
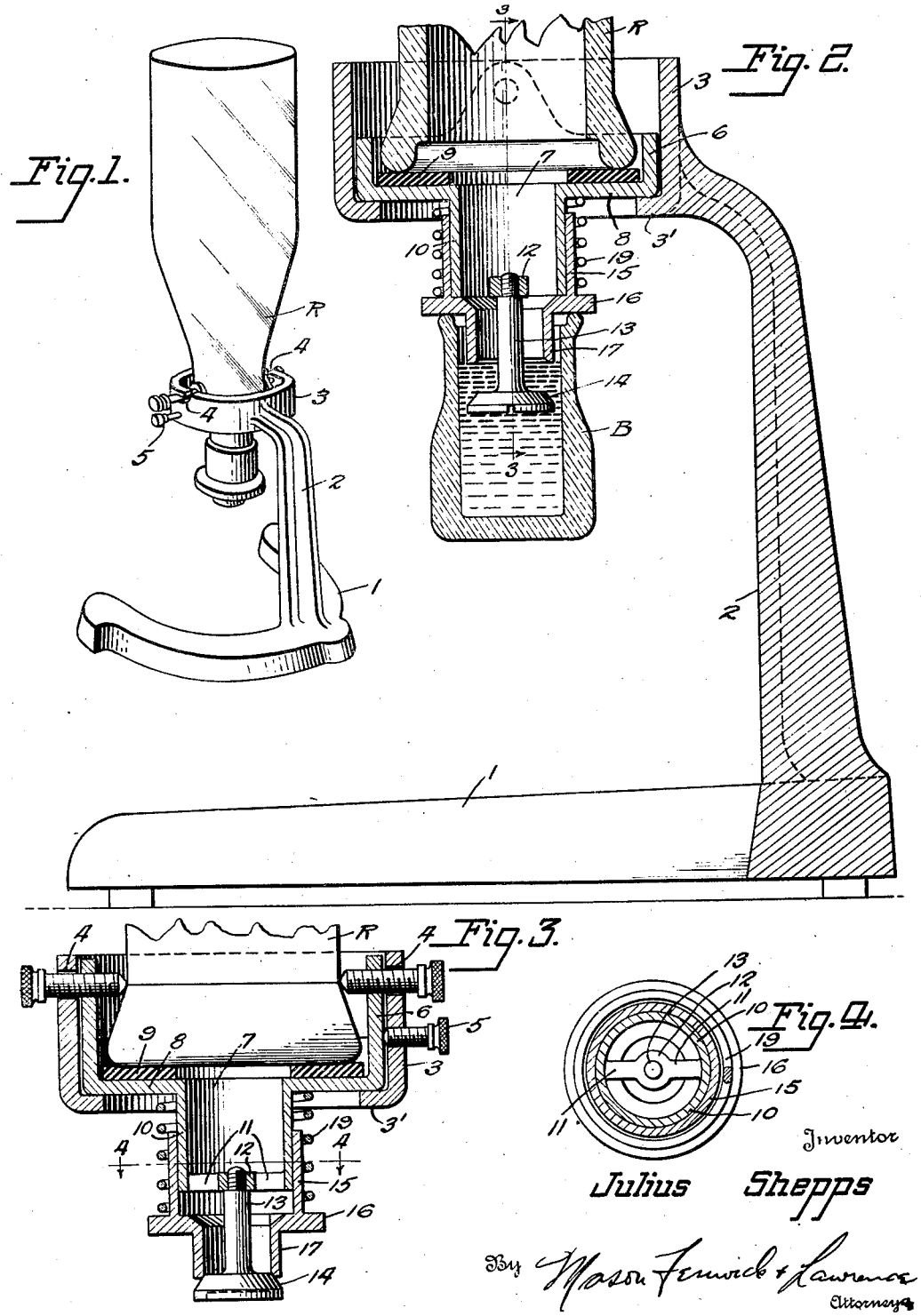
Inventor
Julius Shepps
By Mason Fenwick & Lawrence
Attorneys Patented Feb. 15, 1944

2,341,950

UNITED STATES PATENT OFFICE 2,341,950

DISPENSING DEVICE

Julius Schepps, Dallas, Tex.

Application February 4, 1942, Serial No. 429,546

3 Claims. (Cl. 221—67)

This invention relates to a dispensing device and more particularly to a device for filling bottles and the like.

In restaurants and hotels, in recent years, it has become common practice to serve the cream for coffee in small individual bottles simulating in form the generally used type of milk or cream bottles. This practice eliminates waste, serves an equal portion of cream for each cup of coffee and is attractive to the public by reason of its cleanliness and uniformity. However, the filling of these very small bottles presents a number of practical problems and under methods heretofore known requires considerable attention from the operator and almost necessarily a substantial waste.

Among the problems presented by any attempt to fill such small bottles from a pitcher or spouted container is the difficulty of registering the stream with the very small mouths and controlling the flow of fluid into the bottle. A further difficulty is occasioned by the general use for coffee cream of a mixture of half cream and half milk rather than all milk or all cream, such a "half and half" mixture meeting the general public demand in thickness and richness for this purpose. Such a mixture, however, requires fairly constant agitation to prevent separation.

The present invention is directed to providing a simple, efficient and practical device by means of which a mixture of half cream and half milk in an ordinary milk bottle can be dispensed in relatively minute portions into very small bottles to within a predetermined distance from the mouth of such small bottles without wastage and with accompanying agitation of the mixture in the large bottle produced upon each operation of the device.

A further object of the invention is to provide a device of the general character indicated having a minimum number of parts with those parts of simple form readily assembled and disassembled to permit of cleansing and sterilization.

The invention consists in the novel construction, arrangement and combinations of parts hereinafter more particularly described and claimed.

One sheet of drawings accompanies this specification as part thereof in which like reference characters indicate like parts throughout.

In the drawing:

Figure 1 is a perspective view of the improved device associated with an ordinary milk bottle;

Figure 2 is a fragmentary vertical cross section through the improved device and the mouth portion of a milk bottle;

Figure 3 is a vertical cross section taken on line 3—3 of Figure 2; and

Figure 4 is a horizontal cross section taken on line 4—4 of Figure 3.

A practical and desirable embodiment of the invention is illustrated in the drawing in which 1 indicates a base, here shown as of U-shape, from which rises a vertical pedestal 2 supporting on its upper end a cup-like member 3 having in its bottom 3' a central orifice. In the side walls of the cup member 3 are oppositely disposed bayonet slots 4 which open to the upper edge of the cup and in the side wall of cup 3 is a threaded orifice adapted to receive a thumb screw 5.

A second cup-like member 6 is provided adapted to nest within the first cup 3 and be secured therein by the thumb screw 5. The bottom 8 of cup 6 has a central orifice 7 and a gasket 9 is adapted to seat on the bottom 8 to form a sealing joint with the mouth of the reservoir bottle R. The cup 6 is further provided with a downwardly directed annular flange 10 surrounding the orifice 7 and forming a tubular extension below the bottom of the cup and this annular flange is provided adjacent its lower end with a spider structure comprising radial arms 11 and a central portion 12 having a threaded orifice adapted to receive the threaded end of a valve stem 13 carrying the bevelled valve part 14.

A tubular member 15 is slidably positioned on the annular flange 10 and this tubular member carries on its lower end an annular disk 16 which constitutes a laterally directed flange from which depends the tubular extension 17 provided on its lower edge with a valve seat adapted to coact with the valve member 14. A compression spring 19 is positioned between the flange 16 and bottom 8 of the cup 6 operating to normally force the tubular member 15 away from the cup and the valve seat on tubular member 17 into engagement with the valve 14. The lateral flange 16 constitutes with the depending tubular portion 17 gage means assuring the uniform filling of each of the small bottles to a uniform distance of the top or mouth of the bottle.

It will be observed from the construction as thus described that in use the cup 6 can be removed from the cup 3 of the supporting pedestal by loosening screw 5 and that screw 7 which secured the milk reservoir in cup 6 can be removed from the bayonet slots by a slight rotation of the bottle R. It will also be observed that by unscrewing the valve member 14 from the spider 11 the tubular member 15 and compression spring 19 can be removed from cup 6 for washing and sterilizing.

Preferably all angles on the interior of the various parts will be bevelled to permit a smooth flow and to minimize adhesion of the cream or other fluid to the parts.

With the cup 6 secured to a milk bottle R in sealing relationship with the mouth thereof and the milk bottle inverted and the cup 6 inserted in the cup 3 as illustrated, it will be apparent from a reference to Figure 2 that a small bottle B can be lifted over the valve member 14 until its mouth contacts the lateral flange 15 and that further pressure will elevate the slidable tube 15 on the annular flange 10 opening valve 14 from its closed position shown in Figure 3 to its completely open position shown in Figure 2. The opening of valve 14 will permit air to enter around the mouth of the small bottle and thence up through tubes 17 and 10 to vent the reservoir bottle R while at the same time the mixture of cream and milk in that bottle will descend into the small bottle B until it reaches the bottom edge of the tubular gage member 17 at which point a liquid seal is formed preventing further venting of the container and stopping the flow of the fluid in the small bottle. At this point the compression spring 19 is compressed and therefore as the small bottle is lowered flange 15 will remain in contact with this mouth and thus maintain the seal until the valve part 14 again mechanically seals the tube 17 so that there is no possibility of any discharge of fluid above the point predetermined by the length of the tubular part 17 below the laterally directed flange 15.

It will further be noted that by reason of the venting of the container R by air entering through tubular member 17, there will be a constant agitation of the contents of the container R by the air bubbles rising through the fluid contents, thus maintaining a uniform mixture of the contents of the container so long as the dispensing operation is continued without the necessity of any artificial or other periodic mixing.

Various modifications in the shape and construction of the various parts will readily suggest themselves to those skilled in the art, but within the scope of the present invention as claimed.

Having thus fully described my invention, I claim:

1. A container closure means for removable attachment in sealing relationship to the container mouth with a depending annular flange forming an outlet passage and carrying a fixed valve member, means slidable on said annular flange having a laterally extending valve-operating flange and a depending tubular gage member communicating freely with the passage formed by the annular flange, said gage having its free edge formed as a valve seat to cooperate with the fixed valve member and resilient means normally forcing said valve members into sealing relation.

2. A filling device comprising a supporting member, a cup-like member carried by the supporting device and having a central orifice in its bottom, a second cup-like member adapted to seat in the first having in its bottom a central orifice with a depending annular flange, means for removably securing the second mentioned cup member in sealing relation with the mouth of a bottle, means for removably securing the second mentioned cup within the first mentioned cup with the annular flange extending through the orifice in the bottom of the latter, a valve member carried by said annular flange, a member slidably mounted on the annular flange having a laterally extending flange and a depending tubular gage providing an extension to the bore of the annular flange and having a valve seat on its lower edge adapted to engage the valve member and spring means arranged to maintain said valve normally seated.

3. A filling device comprising a supporting member, a cup-like member on the support having a central orifice in its bottom, a bayonet slot in its side wall, and a thumb screw threaded through its side wall, a second cup member adapted to rest in the first, having a central orifice in its bottom with a surrounding outwardly directed annular flange adapted to pass through the bottom orifice of the first cup member, a gasket seated on the bottom of the second cup surrounding the orifice, a thumb screw threaded through the side wall of the second cup of a length to pass through the bayonet slot of the first cup when the cups are nested and engage the neck of a bottle inverted so that its mouth seals against the gasket in the second cup, a tubular member slidable on the annular flange of the second cup having an outwardly extending medial flange, a compression spring positioned between said flange and the bottom of the second cup, a valve carried by the annular flange of the second cup adapted to seat against the bottom edge of the tubular member, whereby that portion of the tubular member beneath the medial flange thereon operates as a combined gage, vent for the bottle and outlet passage for the contents thereof in the manner specified.

JULIUS SCHEPPS.